United States Patent [19]
Bratkovich et al.

[11] Patent Number: 6,003,301
[45] Date of Patent: Dec. 21, 1999

[54] EXHAUST NOZZLE FOR MULTI-TUBE DETONATIVE ENGINES

[75] Inventors: Thomas E. Bratkovich; Kevin E. Williams, both of Bellevue; Thomas R. A. Bussing, Issaquah; Gary L. Lidstone, Federal Way; John B. Hinkey, Seattle, all of Wash.

[73] Assignee: Adroit Systems, Inc., Bellevue, Wash.

[21] Appl. No.: 08/827,278

[22] Filed: Mar. 27, 1997

Related U.S. Application Data

[63] Continuation-in-part of application No. 08/662,858, Jun. 12, 1996, Pat. No. 5,873,240, which is a continuation-in-part of application No. 08/618,001, Mar. 18, 1996, Pat. No. 5,901,550, which is a continuation-in-part of application No. 08/205,505, Mar. 4, 1994, Pat. No. 5,513,489, which is a continuation-in-part of application No. 08/045,771, Apr. 14, 1993, Pat. No. 5,345,758.

[51] Int. Cl.$^6$ .................................................. F02C 5/02
[52] U.S. Cl. .................. 60/204; 60/247; 60/267; 60/271; 60/39.39; 239/265.17; 239/265.19
[58] Field of Search ............................ 60/204, 225, 247, 60/249, 267, 271, 39.38, 39.39, 39.76, 39.78, 39.5, 244, 39.21; 239/265.17, 265.19

[56] References Cited

U.S. PATENT DOCUMENTS

| | | | |
|---|---|---|---|
| 2,515,644 | 7/1950 | Goddard | 60/39.77 |
| 2,546,966 | 4/1951 | Bodine, Jr. | 60/225 |
| 2,659,198 | 11/1953 | Cook | 60/247 |
| 2,748,753 | 6/1956 | Sarrazin et al. | 60/39.77 |
| 2,888,803 | 6/1959 | Pon | 60/39.38 |
| 2,930,196 | 3/1960 | Hertzberg et al. | 60/39.39 |
| 3,188,804 | 6/1965 | Melenric | 60/249 |
| 3,595,023 | 7/1971 | Stockel | 60/267 |
| 3,877,219 | 4/1975 | Hagen | 60/39.38 |
| 4,196,585 | 4/1980 | Svischev et al. | 239/265.17 |
| 4,314,444 | 2/1982 | Putnam et al. | 60/39.77 |
| 5,079,912 | 1/1992 | Cires et al. | 60/228 |
| 5,080,284 | 1/1992 | Cires | 239/127.3 |
| 5,212,944 | 5/1993 | Martin et al. | 60/253 |
| 5,513,489 | 5/1996 | Bussing | 60/39.38 |
| 5,746,047 | 5/1998 | Steyer et al. | 239/265.17 |

*Primary Examiner*—Ted Kim
*Attorney, Agent, or Firm*—Christensen O'Connor Johnson & Kindness PLLC

[57] ABSTRACT

A nozzle for a detonative combustion engine, the engine having multiple combustor tubes, comprises a common plenum communicating with the combustor tubes. The common plenum combines separate exhaust streams from the combustor tubes into a compound subsonic exhaust stream. A compound flow throat communicates with the common plenum. The compound flow throat converts the compound subsonic exhaust stream into a compound sonic exhaust stream. The common plenum and compound flow throat cooperate to maintain a predetermined upstream combustor pressure regardless of down stream pressure exiting the expansion section. Optionally, an interface section is inserted between the plenum and the engine such that it communicates with the common plenum section and with outlets of the combustor tubes. The interface section is compartmentalized into flow passages with each flow passage having a cross-sectional area that increases from that of a particular nozzle intake port connected to a conductor tube exit. Additionally, an expansion section communicates with the outlet of the compound flow throat and has a diameter greater than the diameter of the compound flow throat. The expansion section converts the compound sonic exhaust stream into a compound supersonic exhaust stream thus expanding the exhaust stream to predetermined lower pressure.

20 Claims, 9 Drawing Sheets

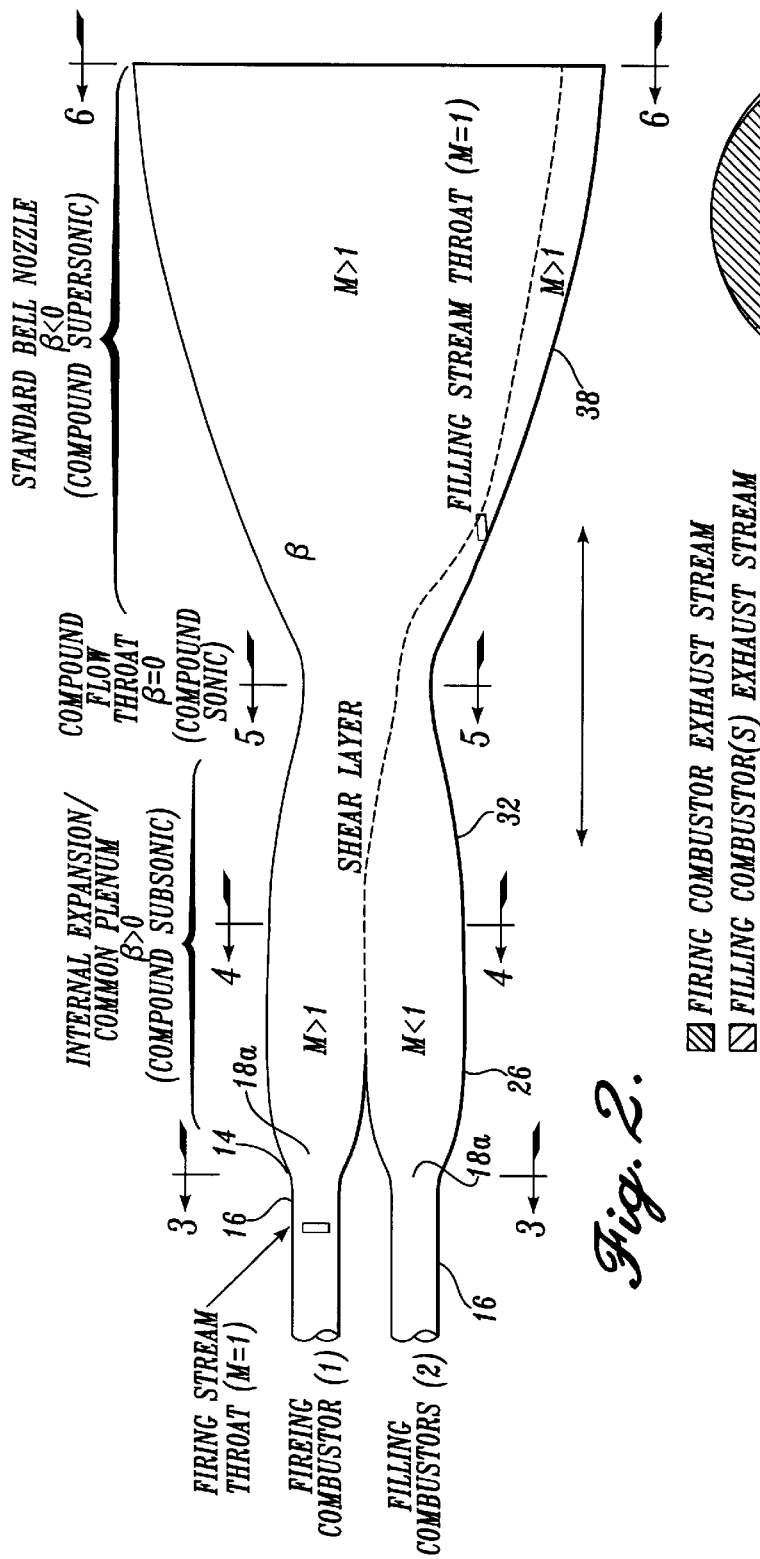
Fig. 2.
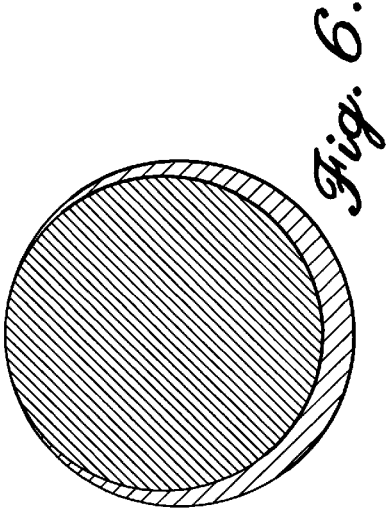
Fig. 6.
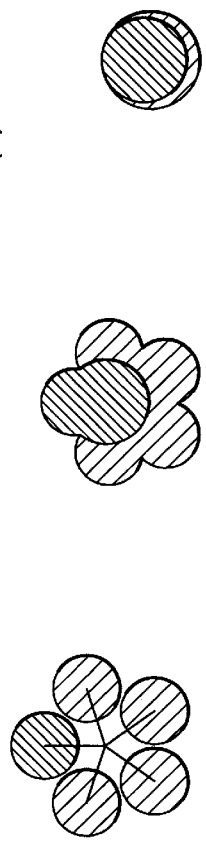
Fig. 5.
Fig. 4.
Fig. 3.

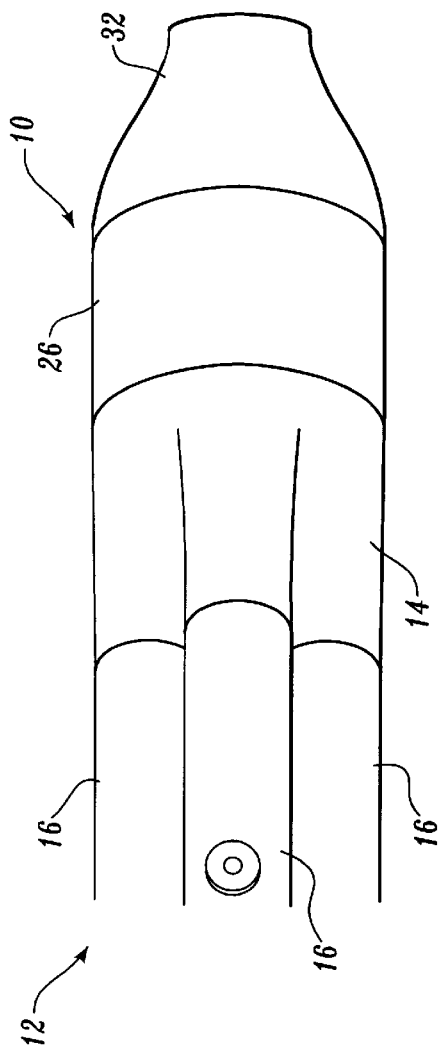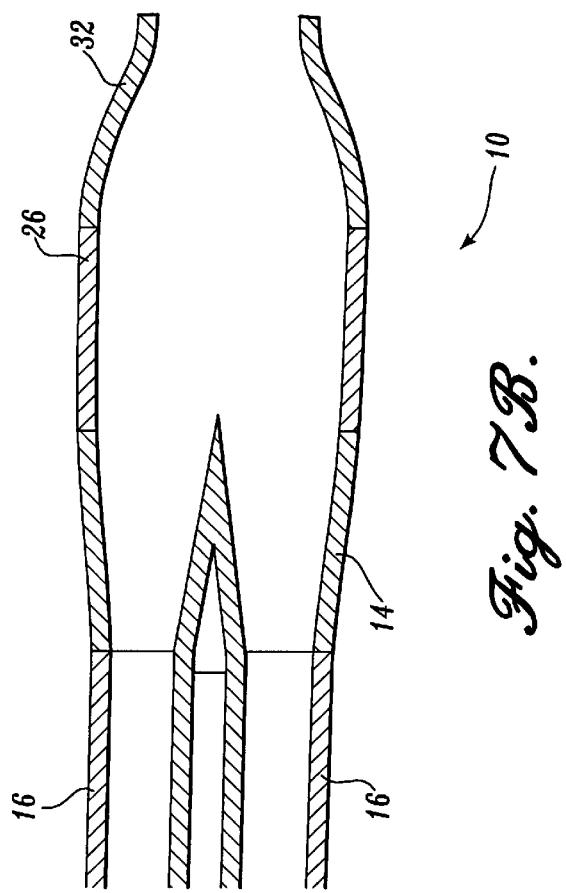

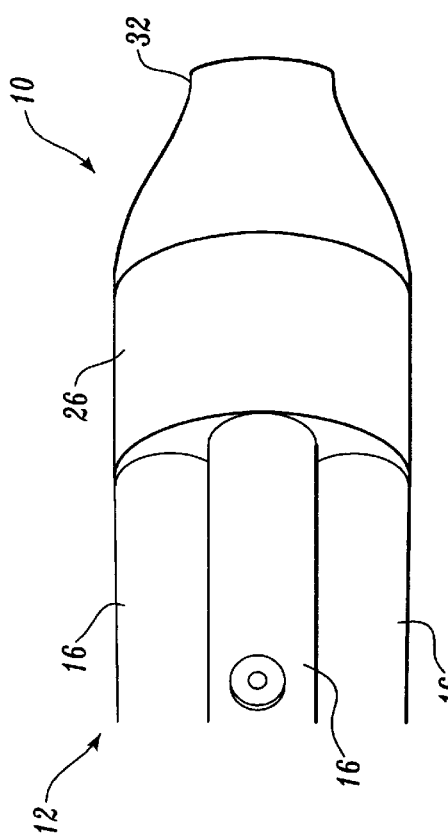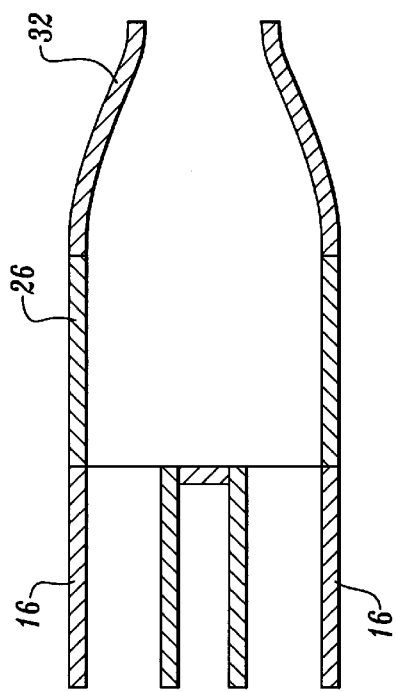

EXHAUST NOZZLE FOR MULTI-TUBE DETONATIVE ENGINES

STATEMENT OF RELATED APPLICATIONS

This application is a continuation-in-part of U.S. patent application Ser. No. 08/662,858, filed Jun. 12, 1996, now U.S. Pat. No. 5,873,240, which is a continuation-in-part of U.S. patent application Ser. No. 08/618,001 filed Mar. 18, 1996, now U.S. Pat. No. 5,901,550 which is in turn a continuation-in-part of Ser. No. 08/205,505 filed Mar. 4, 1994, now U.S. Pat. No. 5,513,489, which is a continuation-in-part of Ser. No. 08/045,771, filed Apr. 14, 1993, now U.S. Pat. No. 5,345,758.

FIELD OF THE INVENTION

The invention relates to exhaust nozzles for detonative engines. More particularly, the present invention provides a nozzle that maintains a desired pressure in all nozzle intake ports regardless of ambient pressure.

BACKGROUND OF THE INVENTION

Nozzles for steady flow chemical propulsion devices (ramjets, turojets, chemical rockets, etc.) are well known in the art. These devices expand high pressure exhaust gas from a combustor in a contained manner such that a pressure differential is established across the wall of the nozzle creating a net force acting along the nozzle axis, thereby increasing the momentum transferred to the engine from the combusted gas, generating additional thrust [Sutton, 1992] [Mattingly et al., 1987]. Steady flow ejectors are also a well documented technology that has been used to augment the thrust created by a propulsion engine by entraining ambient air into the exhaust stream at the engine exit [Oates, 1989]. These steady ejectors are typically heavy and bulky when compared with the additional thrust generated, and therefore have found only limited application. Ejectors for single chamber, airbreathing, pulse deflagration devices (i.e., pulsejets) are also a well documented technology [Johnson, 1967][Lockwood, 1961][Lockwood, 1962]. These devices augment thrust of single chamber pulsed deflagration (pulsejet) combustors.

Relating to the current invention, it is important to understand that chemical propulsion devices may be divided into two classes: detonative and deflagrative combustion engines. In a pulse detonation engine, motive force is provided by expelling combustion products that result from a detonation process. The detonation process combusts reactants in a reaction zone which is coupled to a shockwave, the reaction zone releasing energy to sustain the shockwave, the shockwave enhancing combustion in the reaction zone. This coupled shockwave/reaction zone, commonly referred to as a detonation, propagates through the reactants at very high velocity compared to the propagation of a deflagrative reaction zone (a zone of combustion not coupled to a shock wave). Indeed, typical velocities are of the order of several thousands of feet per second for a detonation compared with a few tens of feet per second for a deflagration. The very high speed of the detonation forces combustion to occur very rapidly, increasing the thermodynamic efficiency of the process and, thus, explaining the motivation for a propulsion device based on this mode of combustion. One mode of operation for a pulse detonation engine is based on the detonative combustion of a fuel/oxidizer mixture in a combustion tube which is closed at one end and open at the other as detailed in U.S. Pat. No. 5,345,758 of T. R. Bussing. For this mode of operation, a detonation wave is initiated at the closed end of a tube filled with reactants consisting of one or more fuels and oxidizers which may be in gaseous, liquid, or solid form. The wave propagates at high velocity through the fuel/oxidizer mixture, producing very high pressure due to the rapid combustion. Forward thrust on the engine is produced as a result of the high pressure acting on the closed end of the tube. When the detonation wave reaches the open end of the tube, it produces a blast wave of high amplitude behind which the high pressure combustion products expel from the tube. The process of filling the tube with a detonable fuel/oxidizer mire and then producing a detonation can be repeated in a rapid manner (i.e., "pulsed") to produce a series of propulsive thrusts. It is the high pressure combusted gas exhausting from the open end of the combustion tube which is to be expanded in the nozzle of this invention in such a way as to maximize the momentum transfer from the exhaust gas to the engine as well as to enable the operation of other combustion tubes or fluid streams which may also be attached to the nozzle of this invention.

Propulsive devices which utilize deflagrative combustion are very well known and are typically used in commercial jet airliners, for instance. Indeed, all mass-produced propulsive devices which derive propulsive force from chemical combustion are based on deflagrative combustion. Deflagrative engines also include pulsejets which have a tube which has a set of reed valves (one-way valves) at one end, while being open at the other end. Operation is achieved by partially filling the combustion chamber with a combustible fuel/air mixture near the valved end, with the balance of the tube containing air drawn in from the open end. The combustion of the fuel/air mixture produces a moderate pressure wave which propels the combustion products and remaining air in the tube out of the open end. The over-expansion of the flow out of the open end then allows air to be drawn in through the one-way valves at the closed end and through the open end. Fuel is injected into the fresh air in the tube and the cycle is repeated. The repetition rate is controlled by the frequency of fuel injection and ignition can be self-sustaining once initiated with a spark device. Of importance is the detonative combusted gas exhausting from the open end of the combustion tube which is to be expanded in the nozzle of this invention in such a way as to maximize the momentum transfer from the exhaust gas to the engine as well as to enable the operation of other combustion tubes or fluid streams which may also be attached to the nozzle of this invention.

SUMMARY OF THE INVENTION

A unique outlet nozzle for a detonative combustion engine having more than one combustor tubes, which are exhausted to the nozzle that provides a substantially invariant cyclic pressure at exit ends of the combustion tubes regardless of variation in ambient pressure in the environment surrounding the outlet nozzle. Moreover, even though some combustor tubes may be in firing mode (i.e., combusting fuel) and others in filling mode (i.e., being injected with fuel), the exit ends of the tubes communicate with a common zone in the nozzle such that tube exit end pressures are matched (or "equalized").

The nozzle, which may be used with either rocket or airbreathing detonative combustion engines, includes in series: an interface section (in preferred embodiments), a plenum, a compound flow throat, an expansion section (optional with airbreathing engines), and an (optional) air entrainment device attached to a rear end of the expansion section.

The interface section has multiple intake nozzles at its front end, each designed to connect to the exit end of a particular combustor tube. Preferably, the interface section, which also communicates with the common plenum, is compartmentalized into separate flow passages with each flow passage connecting to a particular intake nozzle. The purpose of the flow passages is (as explained below) to expand the individual fluid streams from the intake nozzle inlet ports to equalize the fluid stream pressures between intake ports.

The common plenum communicates with the combustor tubes (through the interface section, when one is present) and combines separate exhaust streams from the fluid passageways of the interface section into a compound subsonic exhaust stream which flows into the throat. The throat converts the compound subsonic exhaust stream into a compound sonic exhaust stream.

Importantly, as explained above, the interface section, the common plenum and compound flow throat are designed to cooperate so as to maintain a predetermined and substantially constant or cyclically invariant pressure at the exit of each combustion tube (which may be different from tube to tube), regardless of downstream pressure exiting the nozzle. Thus, from one firing cycle to another, the shape of the pressure versus time curve remains substantially constant or invariant for each successive cycle of the particular combustor.

The nozzle also includes an optional expansion section at its exhaust end which communicates with the compound flow throat and which is positioned downstream of the throat. Airbreathing engines may dispense with the expansion section, but its use is preferred with rocket engines. The expansion section converts the compound sonic exhaust stream at the compound throat into a compound supersonic exhaust stream. Additionally, the nozzle has an (optional) air entrainment device attached to the expansion section that augments thrust by entraining ambient fluid into the exhaust stream.

Most preferably, at least one of the interface section, common plenum, compound flow throat and expansion section can be either symmetrically or asymmetrically varied in cross sectional area (for fluid flow) while the nozzle is in operation. Additionally, preferably for a rocket and alternatively for an airbreathing engine, at least one of the nozzle sections, such as the interface section, the common plenum, the compound flow throat and the expansion section, has a thermal protection system that includes coolant passing through channels in or adjacent the nozzle walls. The coolant may be fuel or another fluid. Preferably for a rocket, and as an alternative for an airbreathing engine, the nozzle also includes a thermal barrier coating on its interior nozzle, or an ablative liner.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a schematic representation of the exhaust stream dynamics occurring within each portion of the preferred embodiment of the nozzle of the present invention for a detonative rocket engine;

FIG. 3 is a cross sectional schematic representation of a plurality of separate exhaust streams prior to entry into the interface section of the preferred embodiment of the nozzle of the present invention for a detonative rocket engine;

FIG. 4 is a cross sectional schematic representation of the combining of the separate exhaust streams from the combustor into a compound subsonic exhaust stream while passing through the common plenum of the preferred embodiment of the nozzle of the present invention for a detonative rocket engine;

FIG. 5 is a cross sectional schematic representation of a plurality of exhaust streams having been combined into a compound sonic exhaust stream while passing through the compound flow throat of the preferred embodiment of the nozzle of the present invention for a detonative rocket engine;

FIG. 6 is a cross sectional schematic representation of a plurality of exhaust streams having been combined into a compound supersonic exhaust stream after passing through the expansion section of the preferred embodiment of the nozzle of the present invention for a detonative rocket engine;

FIGS. 7A and 7B depict an embodiment of a nozzle in accordance with the invention, that does not include an expansion section; FIG. 7B is in cross section;

FIGS. 8A and 8B depict a nozzle in accordance with the invention, that does not include an interface section or an expansion section, FIG. 8B is in cross section;

FIG. 9B is in cross section;

FIG. 10B is in cross section;

DETAILED DESCRIPTION OF THE PREFERRED EMBODIMENTS

Figure 1:
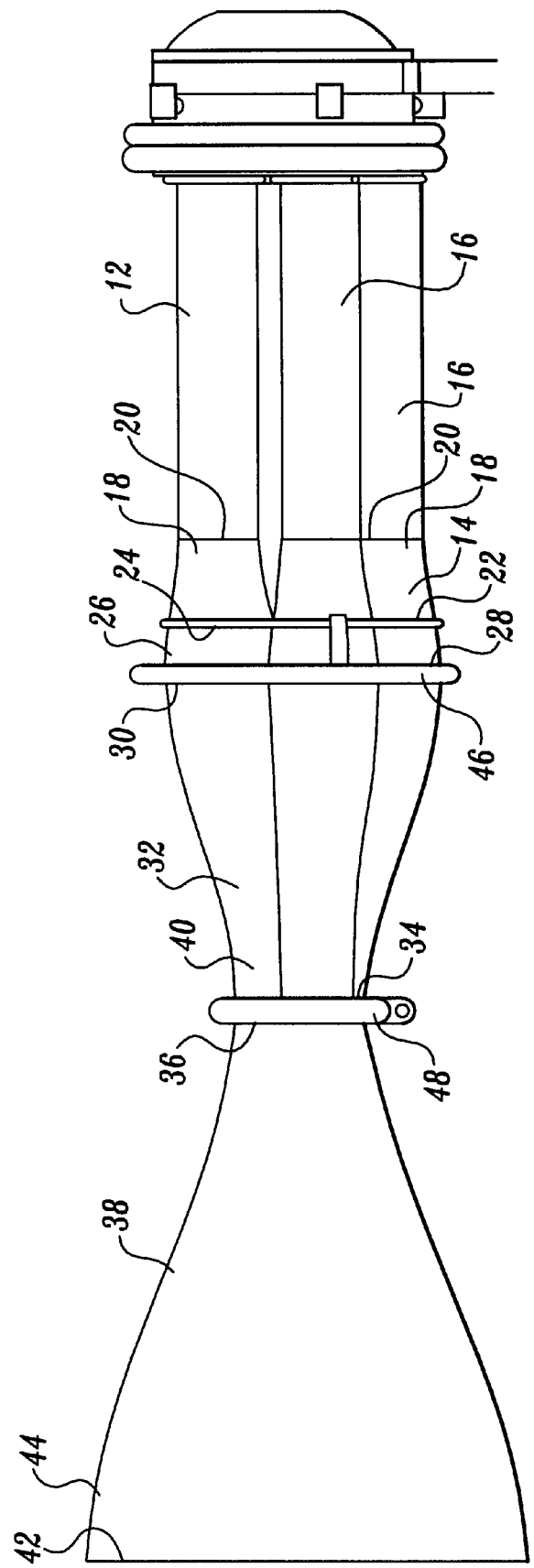
FIG. 1 is a side schematic view of the preferred embodiment of a nozzle in the present invention attached to combustors of a typical pulsed detonative rocket engine.

FIG. 1 shows a combustor 12 of a multi-tube combustion engine, whether rocket or airbreathing, to which is attached an outlet nozzle 10 of the invention. As is conventional, the combustor 12 includes a plurality of combustion tubes 16, shown in the example of FIG. 1 as parallel cylindrical combustors radially arrayed around a common central axis C of combustor 12 which fire in a sequence that is cyclically repeated. Thus, the pressure at the exit end of each tube varies cyclically depending upon which part of the filling or firing cycle it is in. Clearly, arrangements other than the radial array of the multiple combustion tubes 16 of the rocket/airbreathing engine are also feasible, and the nozzle 10 of the invention may be adapted, as will become clear from the description herein, to accommodate such alternative designs.

The embodiment of nozzle 10 of the invention shown in FIG. 1 includes an interface section 14, nearest to the combustor 12; a common plenum 26 downstream of the interface section; a compound flow throat 32 downstream of the common plenum; and an expansion section 38. Not all of these sections are essential to the invention, as explained below.

Referring to FIG. 2, the upstream end of the interface section 14 includes a plurality of nozzle intake members 18 at its front end, each adapted for engaging a downstream end 20 of one of the combustion tubes 16. Thus, exhaust fluid communication is established between the combustion tubes 16 and the interface section 14. At its opposite end, the interface section 14 is sized and shaped to cooperate with the upstream end 24 of the common plenum section 26, thereby establishing fluid communication between these two sections. The cross sectional area for throughflow of exhaust gases of the interface section 14 is larger at its outlet or downstream end 22, than its inlet or upstream end which has nozzles 18. Thus, for example, when the interface section is circular in cross section, then it is preferably cone-shaped with a smaller diameter of the cone upstream adjacent to the combustor 12 and the larger diameter end downstream adjacent the plenum 26. This expansion of throughflow cross sectional area allows expansion of exhaust combustion gases from the exit ends of combustion tubes 16, through the passages of the interface section, and allows equalization of exhaust combustion pressure in the interface section. This pressure equalization is an important feature of the invention since some of the combustion tubes are in a filling (or fuel charging) mode while one or more may be in firing mode.

The common plenum section 26 has a cross sectional area for flow of exhaust gas that is greater than, or at least equal to, the combined cross-sectional flow areas of combustor tubes 16. Exhaust gases exiting from the rear end 22 interface section 14 enter into the front end 24 of common plenum section 26 where the gases mix to form a single compound subsonic exhaust stream of gases.

The downstream, or outlet end 28, of the common plenum 26 couples to the upstream end 30 of compound exhaust flow throat 32 so that they are in fluid communication. Thus, exhaust gases exiting from the common plenum enter into the exhaust throat 32. Exhaust throat 32 decreases in cross sectional area for exhaust gas flow from its inlet end 30, to its outlet end 34. Thus, exhaust gases are compressed as they progress through the throat, to form a compound sonic gas stream.

Downstream of the compound flow throat is an expansion section 38, which is coupled to and in fluid communication with the throat 32. When an airbreathing engine is used, the expansion section may be truncated, or even eliminated. The expansion section 38 is shaped such that it has the smallest cross sectional area for exhaust gas flow adjacent the rear end 34 of compound flow throat 32, and the largest cross sectional area for flow at its opposite end 44. Thus, exhaust gases entering the expansion section 38 undergo rapid expansion in volume and consequently an increase in linear velocity. This increase in linear velocity is sufficient to increase the speed of the exhaust gases from compound sonic to compound supersonic speeds in the expansion section, before the gases exit from this section into the environment.

It is an important aspect of the invention that sections of the nozzle cooperate to maintain a predetermined combustor tube exit pressure, adjacent outlet ends of the combustor tubes 16, regardless of downstream pressure at the exit end of the throat or the expansion section. Thus, comparing pressures at the exit end of any tube from one cycle to another, any variation in the cyclic pressures for a particular operation condition is less than 5% so that it is "substantially invariant" regardless of the outside environment. This aspect of the invention has clear implication for vehicles that are propelled from the earth's surface into the atmosphere and even into space, thereby flying through an environment where outside pressure continually decreases.

Optionally, nozzle 10 can also include coolant manifolds 46 and 48 oriented on all or part of one or more of interface section 14, common plenum 26, common flow throat 32, and expansion section 38. For example, in FIG. 1, a coolant manifold 46 is shown circumferentially oriented around compound flow throat 32 adjacent upstream end 30 thereof, and coolant manifold 48 is shown circumferentially disposed around the juncture of downstream end 34 of compound flow throat 32 and upstream end 36 of expansion section 38. Coolant manifolds 46 and 48 have the primary function of the collection and distribution of coolant, the coolant being fuel or other fluid, throughout the nozzle structure to cool all or a portion of nozzle 10. In addition to cooling structure, the interior walls of nozzle 10 can include a coating consisting of a thermal barrier material or ablative material whose purpose is to thermally insulate nozzle 10.

The internal cross sectional areas of one or more of interface section 14, common plenum 26, compound flow throat 32 and expansion section 38 can be varied, either symmetrically or asymmetrically, to obtain the desired exhaust stream dynamics or to direct the thrust vector of the exhaust stream away from the centerline of nozzle 10.

Referring to FIG. 2, a schematic representation of the exhaust stream dynamics occurring within combustor tubes 16, interface section 14 (with gas flow passages 18*a*), common plenum 26 and expansion section 38 is shown.

FIG. 3 shows an example of a cross sectional schematic representation of a plurality of separate exhaust streams from combustor tubes 16 of combustor 12 prior to entry into interface section 14 of nozzle 10 where exhaust stream pressure equalization will occur.

FIG. 4 is a cross sectional schematic representation of the combining of the separate exhaust streams with equalized exhaust stream pressures into a compound subsonic exhaust stream by passage through common plenum 26 of nozzle 10.

FIG. 5 is a cross sectional schematic representation of the creation of a sonic exhaust stream from the subsonic exhaust stream by passage through compound flow throat 32 of nozzle 10.

FIG. 6 is a cross sectional schematic representation of the conversion of the compound sonic exhaust stream into a compound supersonic exhaust stream by passage through expansion section 44 of nozzle 10.

Referring back to FIG. 2, the design of nozzle 10 is based on the principle of compound supersonic-subsonic flow.

This principle may be analyzed using quasi-one-dimensional compressible flow theory [Clark, 1995] [Bernstein et al., 1966]. For an arbitrary number of flow streams, the sum area of the streams and the x-direction variation of the sum area can be represented by:

$$A = \sum_{i=1}^{n} A_i \qquad (1)$$

$$\frac{dA}{dx} = \sum_{i=1}^{n} \frac{dA_i}{dx} \qquad (2)$$

For the purpose of this analysis each stream can be considered a compressible one-dimensional flow such that:

$$\frac{dA_i}{dx} = \frac{A_i}{\gamma_i}\left(\frac{1}{M_i^2} - 1\right)\frac{d}{dx}(\ln(P)) \qquad (3)$$

where $\gamma_i$ and $M_i$ are the ratio of specific heats and Mach numbers of each stream, P is the static pressure which is assumed to be a function of x only thus being constant across each stream at each x-location. Combining the above equations leads to:

$$\frac{d}{dx}(\ln(P)) = \frac{1}{\beta}\frac{dA}{dx} \qquad (4)$$

where:

$$\beta = \sum_{i=1}^{n} \frac{A_i}{\gamma_i}\left(\frac{1}{M_i^2} - 1\right) \qquad (5)$$

It has been shown that β can be considered the compound flow indicator, going from positive values, through 0, to negative values as the compound flow passes from compound subsonic, through compound sonic, to compound supersonic as shown in FIG. 2. The above analysis is applicable to nozzle 10 since there is not only the high pressure fluid being expelled from combustor tube 16 that is presently firing, but also the fluid being displaced in combustor tube 16 by the filling slug of fresh propellant flowing in each combustor tube 16 that is being filled. The fluid stream from combustor tube 16 will be expanding from a sonic condition to a supersonic condition at the exit of combustor tube 16 that is firing, while the fluid stream expelled from the combustor tube 16 that is filling will be at a very low subsonic condition, thus forming a compound flow, as shown in FIG. 2. In order to maintain the pressure desired for the filling process in combustor tube 16 that is filling, the compound flow leaving the filling and firing combustor tubes 16 must be compound subsonic, as shown in FIG. 2. Thus, if a contraction is introduced into the compound flow such that β is zero, the nozzle flow can be choked and the pressures in the combustor 16 that are filling will be independent of the ambient pressure. To utilize this principle, however, the static pressure at the exit of the combustor tube 16 that is firing must be matched to the static pressure at the exit of the combustor tubes 16 that are filling. Since the static pressure within the combustor tube 16 that is firing is initially much higher than the static pressure in the combustor tubes 16 that are filling, the cross sectional area in nozzle 10 must expand. A single area expansion can be calculated such that if the fluid stream from each of combustor tubes 16 is expanded to that area, regardless of whether or not the individual combustor tube 16 is filling or firing, the pressure in each fluid stream from combustor tubes 16 will be equal. The purpose of the interface section 14 is to individually expand each of the fluid streams from the combustor tubes 16 to that area.

It has been observed that when the area-averaged Mach number of a compound flow containing both subsonic and supersonic streams reaches one, the flow "chokes." The flow of the compound sonic condition behaves the same as the flow of a traditional sonic condition even though some of the fluid streams in the compound flow are subsonic. Because of this effect, a contraction can be introduced in the nozzle 10 flow such that the compound flow chokes. Once this occurs, the static pressures upstream of this contraction will be controlled by the static pressure of the supersonic flow from the combustor tube 16 that is firing, and will be completely independent of the static pressure at downstream end 42 of expansion section 38 of nozzle 10. With this in mind, the cross sectional area of the flare, i.e., interface section 14, adjacent to downstream ends 20 of combustor tubes 16 can be adjusted so as to expand the supersonic flow during firing to attain the static pressure desired for the combustor tubes 16 streams that are filling. Once the firing stream has been expanded in interface section 14 to the proper static pressure, the stream enters common plenum 26. Because the static pressure must match across the shear layer (that interface between gas streams), as shown in FIG. 2, the static pressure of the stream of the firing combustor tube 16 will influence the static pressure of the subsonic streams of the filling combustor tubes 16. Because the streams from the filling combustor tubes 16 are subsonic, the pressure obtained in the common plenum 26 that equalizes the pressure of the stream from the firing combustor tube 16 will influence the pressures upstream in combustor tubes 16, thus holding the pressure needed for the filling process.

If the engine is a pulse detonation engine, the methodology is cyclical, and at any given time, at least one combustor tube 16 will be firing while the remaining combustor tubes 16 will be filling. Once the at least one combustor tube 16 is finished firing, the next combustor tubes 16 fires and the process is maintained.

The objectives of the invention may be achieved by a variety of alternative outlet nozzle designs. FIGS. 7A, 7B, 8A, 8B, 9A, 9B, and 10A, 10B illustrate a few examples of outlet nozzles in accordance with the invention. The embodiment shown in FIGS. 7A and 7B do not include an expansion section aft of the throat section 32. Instead, exhaust gases flow from combustor tube 16 directly into the interface section 14, thence into common plenum 26, and finally through the throat 32 before exhausting into the surrounding environment. This type of nozzle without an expansion section may advantageously be employed with airbreathing engines. However, an expansion section is preferred with rocket engines. Likewise, the embodiment of FIGS. 8A and 8B do not include an expansion section, and may be used with airbreathing engines. This embodiment also lacks an interface section, so that exhaust gases flow directly from the combustor tube 16 into the common plenum 26, where compound subsonic flow is achieved. Thereafter, the gases pass through throat 32, where flow is boosted to compound sonic levels, before exiting into the surrounding environment, resulting in equalization of pressures at the combustor tube exits.

Figure 9A:
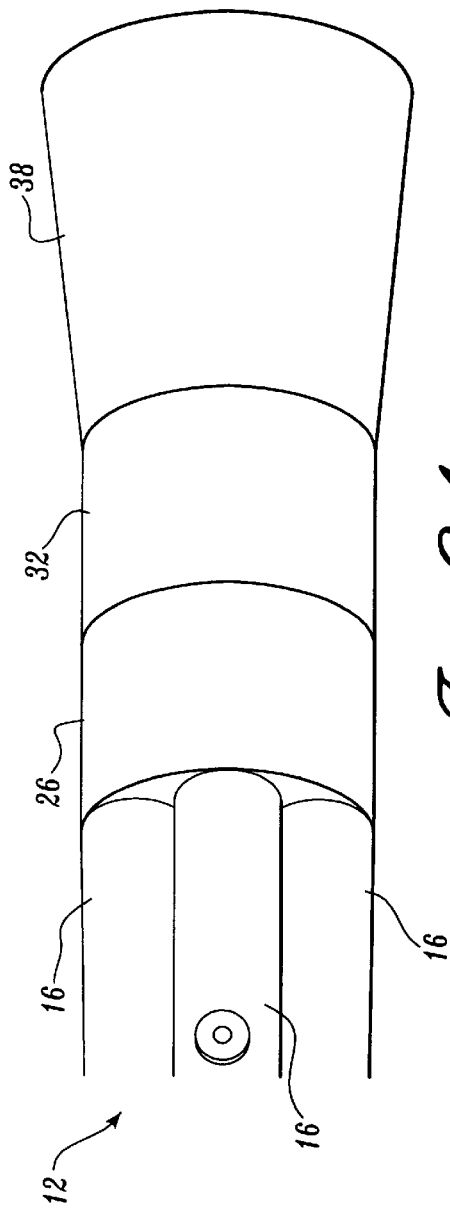
FIGS. 9A and 9B illustrate an embodiment of an output nozzle in accordance with the invention that does not include an interface section.
Figure 9B:
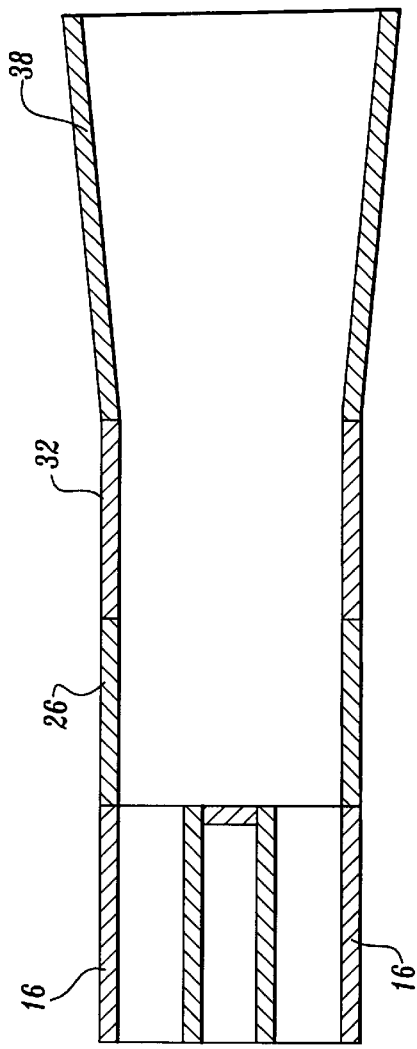
Figure 10A:
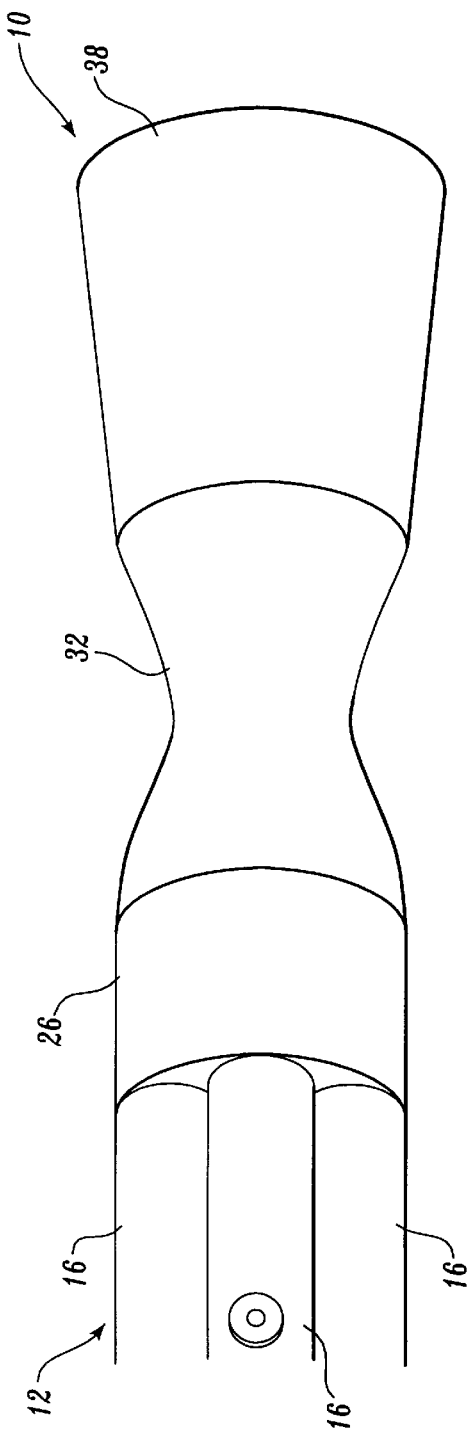
FIGS. 10A and 10B depict an embodiment of an outlet nozzle in accordance with the invention, that does not include an interface section.
Figure 10B:
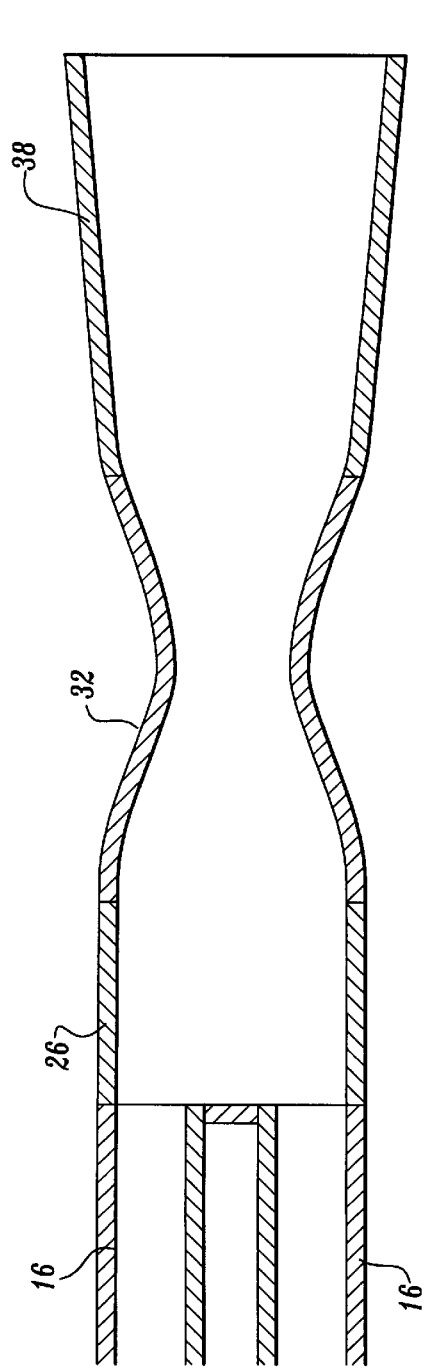

The embodiment of FIGS. 9A and 9B also does not include an interface section, but includes an expansion section 38. Accordingly, this type of nozzle is suitable for use with rocket engines. Once again, exhaust gases flow directly from combustor tubes 16 into common plenum 26 where mixing to compound subsonic velocities take place. In this instance, the throat section 32 has a cross sectional area for flow that is substantially equal to the flow area of the plenum 26. Nevertheless, the gas flow is boosted to compound sonic speeds in the throat 32 via a fluid dynamic flow constrictor, before entering the expansion section 38 where velocity is further increased to supersonic speeds before exhaustion into the environment. In contrast, the embodiment of FIGS. 10A and 10B include a throat section 32 that is preferred, where the cross sectional area for flow through the throat is significantly less than through the plenum 26. Accordingly, boosting to sonic velocity is more readily achieved. The embodiment of FIGS. 9A and 9B is most suitable for those instances where exhaust gases exiting from the combustor tube 16 are already near sonic velocity, or where subsequent expansion in the expansion section 38 is sufficient to boost to supersonic conditions.

In order to achieve the objectives of the invention, namely the maintaining of a substantially invariant cyclic pressure at the exit ends of the combustor tubes of the combustion engine, $\beta$ must be positive in the plenum. As a practical matter, this means that the fluid flow area in each of the fluid passageways of the interface section must increase so that, at the exit of these passageways (which coincides with the inlet to the plenum) the pressures are equalized and the fluid streams combine to form a compound subsonic flow such that $\beta$ is greater than zero. Similarly, the compound exhaust throat must be sized such that exhaust gases from the plenum are accelerated such that $\beta$ equals zero. This requires that the area for fluid flow in the throat must be less than the area for fluid flow through the plenum. If an expansion section is necessary (it may be desirable for airbreathing engines to have a nozzle without an expansion section) it is designed to allow expansion of the exhaust gases such that $\beta$ is less than zero (i.e., compound supersonic flow). The cross sectional area for fluid flow in the expansion section is greater than in the throat section, but not necessarily greater than in the plenum section.

The following relationships exemplify an outlet nozzle in accordance with the invention for a particular pulse detonation engine designs (all "areas" designated "A" refer to cross sectional areas for throughflow of gases):

$D_C$ The mean diameter of a combustor.

$P_F$ Pressure in firing combustor=8.34 $P_R$ ($P_R$=Pressure in recharging (filling) combustor)

$A_F$ Area of firing combustor=1.0 $A_R$. ($A_R$=Area of recharging (filling) combustor=1.0 $A_F$)

$A_{FI}$ Exit area of the firing compartment of the interface section=2.93 $A_F$=2.93 $A_R$ $A_{RI}$ Exit area of the recharging (filling) compartment of the interface section=1.0 $A_{FI}$=2.93 $A_R$ $P_{FI}$ Exit pressure of the firing section of the interface section=1.0002 $P_R$ $P_{RI}$ Exit pressure of the recharging (filling) compartment of the interface section=1.0 $P_{FI}$=1.0002 $P_R$ $L_I$ Length of interface section=a sufficient length to expand both streams as isentropically as possible but not so long as to cause weight disadvantages with the engine (this is a design tradeoff typically, between 1.0 $D_C$ and 5.0 $D_C$ for this design).

$A_P$ The area of the common plenum (=$\Sigma A_F$) For this example is 5 $A_{RI}$ because there are 5 combustors. This, of course, changes with numbers of combustors. For this example $A_P$=14.65 $A_R$ $\beta_P$ The compound flow indicator (Equation no. 5 of text or $\beta$) must be a positive number. The purpose of the interface section is to (1) equalize $P_{FI}$ and $P_{RI}$ and (2) ensure that $\beta$ is positive. $\beta$ must be positive (i.e., flow must be compound subsonic in the plenum)

$L_P$ The length of the plenum will be dictated in part by the losses introduced by the shockwaves traveling through the plenum each time a combustor fires. The longer the plenum, the lower the losses; the shorter the plenum, the lower the weight. Typically $L_P$ is from about 0.5 to about 2.0 $D_C$ for this design.

$A_T$ The minimum area of the throat=0.2152 $A_P$=3.69 $A_R$. This area is determined by solving for $\beta$=0 and is, therefore, very dependent on flow properties specific to a particular design.

$\beta_T$ The compound flow indicator $\beta$ must be zero in the throat. The purpose of the throat is to constrict the compound flow to the point where $\beta$ becomes 0 (i.e., the compound flow becomes sonic).

$L_T$ The length constraints are similar to previous lengths discussed above. The longer the throat contraction the better. ($L_T$=2.0 $D_C$ to 10 $D_C$ for this example.)

$A_E$ The area at the expansion section exit. This area is sized to achieve the desired exit pressure, $P_E$. For this example, $A_E$=13.1 $A_T$=48.2 $A_R$ $P_E$ The exit pressure at the expansion section. This pressure is a design point dictated to the nozzle designer. For this example, $P_E$=0.0257 $P_R$ $\beta_E$ The compound flow indicator in the expansion section must be negative, i.e., the compound flow must be supersonic.

$L_E$ The length of the nozzle which is based on performance versus system tradeoffs. For this example, $L_E$=7 DT=13.5 $D_C$ Referring to FIG. 11, nozzle 10 can utilize a fluid entrainment device 54 for thrust augmentation. The purpose of fluid entrainment device 54 is to provide additional thrust for the vehicle during certain portions of the flight trajectory. Fluid entrainment device 54 preferably comprises an annular ring 56, spaced from downstream end 42 of expansion section 38 of nozzle 10 by a plurality of ribs 58 such that openings 60 are present between annular ring 56 of fluid entrainment device 54 and downstream end 42 of expansion section 38 of nozzle 10. Note that the fluid entrainment device 54 may be an integral portion of the nozzle of this invention, or the fluid entrainment device 54 may be a separable entity that is attached to the aft end of the nozzle 10 via releasable linkages.

The fundamental operation of the fluid entrainment device 54 is closely coupled to the unsteady physics of the nozzle 10. Fluid entrainment device 54 produces thrust augmentation by two methods. In a first method, referring to FIG. 11, as the hot exhaust from nozzle 10 passes through annular ring 56, cool fluid is drawn into ring 56 through openings 60 by the action of viscosity and pressure differential. The passage of the entrained fluid across the annular ring 56, having an aerodynamic cross section, generates a net force on the annular ring 56 in the same way as the airflow across the wing of an airplane generates a net force to lift the airplane. The force imparted on the annular ring 56 acts in the direction of the nozzle thrust vector, thus augmenting the thrust of the nozzle.

Figure 12:
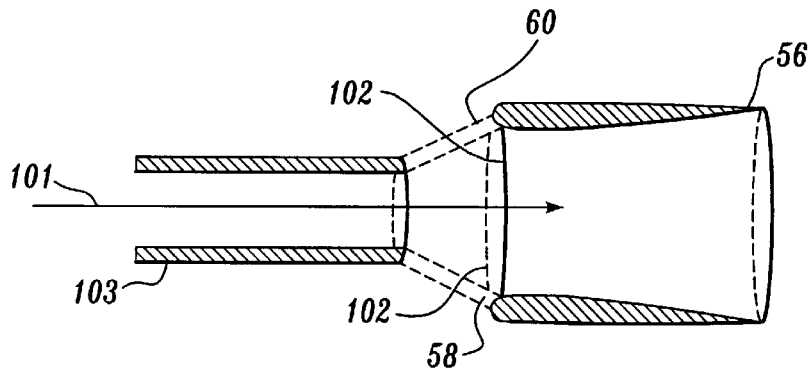
FIG. 12 is a schematic representation of a fluid entrainment device coupled to a single unsteady combustion chamber.

The other method by which fluid entrainment device 54 obtains thrust augmentation is through an unsteady gas dynamic pumping process. Referring to FIG. 12, hot product gases (primary flow 101) from combustion tube 103 are expelled from the combustor tube 103 through the fluid entrainment device 54. This hot primary flow, being of a pulsed nature, encounters a slower moving relatively cool fluid within the fluid entrainment device 54. This relatively cool fluid was entrained into the fluid entrainment device 54 as a result of the action of viscosity and pressure difference created by the previous "pulse." The cool fluid entered the fluid entrainment device 54 via the secondary stream 102 which had previously entered the annular ring 56 through openings 60. The result of the hot, less dense, product gases impacting the cool, more dense, entrained fluid is a compression wave that moves toward the aft end of the fluid entrainment device 54. This compression wave reflects as an expansion back into the fluid entrainment device 54 at the exit. The net effect is to accelerate the fluid from the secondary stream 102 through the annular ring 56 creating a gas dynamic pumping process. The momentum transfer from the primary stream 101 to the secondary stream 102 results in a net pressure force acting in the forward direction being imparted to the annular ring 56. As the primary flow 101 subsides due to natural operation of the unsteady combustion tube 103, secondary flow 102 is drawn into ring 56 through openings 60 via a pressure differential across the openings 60.

Figure 13:
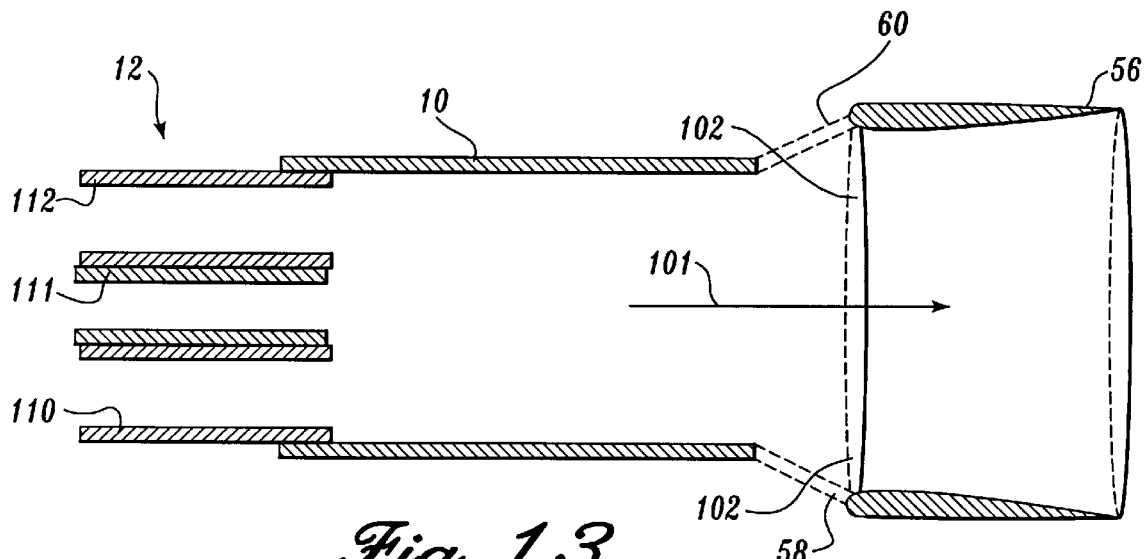
FIG. 13 is a schematic representation of the nozzle of the present invention having a fluid entrainment device attached thereto.

For a multiple chamber pulse detonation device, such as in FIG. 13, the fluid entrainment device 54 works individually on each stream of detonation combustion products as they encounter the annular ring 56 at staggered times during the multiple combustor firing cycle. Thus, as the primary stream 101 from the unsteady discharge of the first combustion tube 110 encounters the augmentor body, a series of compression and expansion waves accelerates the secondary flow 102 already in the fluid entrainment device 54 towards the aft end. As the primary flow 101 from the first combustor 110 subsides, the secondary stream is entrained through the augmentor at the same circumferential location due to unsteady flow pressure forces. In the meantime, the primary flow 101 from second combustor 111 is entering the augmentor, accelerating the circumferentially local secondary flow 102 from the previous cycle. In this manner, alternate portions of the secondary flow 102 are entrained into the fluid entrainment device 54 around the circumferential periphery of the annular ring 56 in opposition to the localized primary flows 101 exiting the unsteady combustor tubes 12. The momentum transfer from the primary stream 101 to the secondary stream 102 results in a net pressure force acting in the forward direction being imparted to the annular ring 56. As the primary flow 101 subsides due to natural operation of the unsteady combustion tubes 12, secondary flow 102 is drawn into ring 56 through openings 60 through the action of local expansion waves creating a pressure differential across the openings 60.

Figure 11:
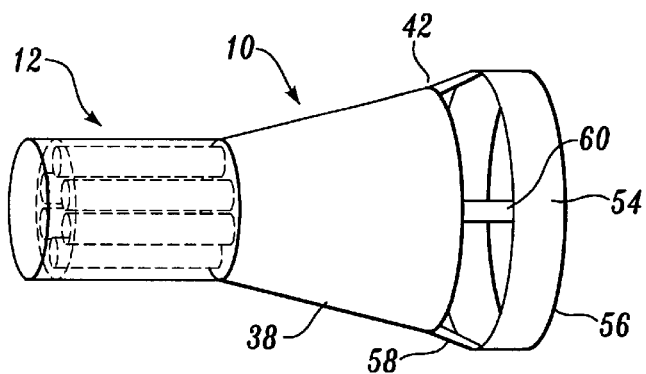
FIG. 11 is a perspective schematic view of a pulse detonation rocket engine incorporating the nozzle of the present invention having a fluid entrainment device attached thereto.
Figure 14:
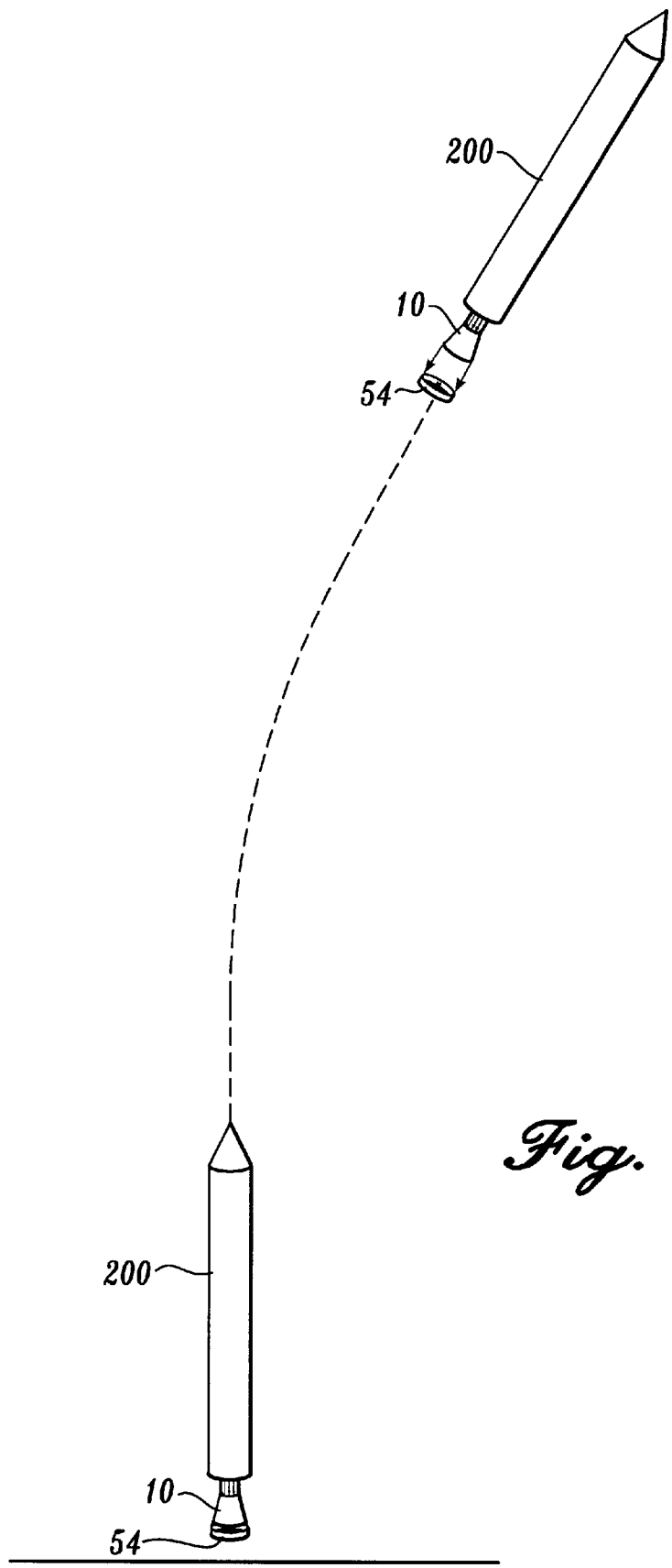
FIG. 14 is a schematic representation of a rocket vehicle having a pulse detonation rocket engine as the propulsive device, the engine incorporating the nozzle of the present invention therein illustrating the jettisoning of the fluid entrainment device attached to the nozzle of the present invention.

Inasmuch as the benefit of the augmentor may be diminished as the properties of the ambient fluid through which a device flies changes, it may be desirable to discard the fluid entrainment device 54 at some point in a flight trajectory. To illustrate this process, consider a fluid entrainment device 54 on a pulse detonation rocket engine (PDRE) nozzle 10 as shown in FIG. 14. Preferably, annular ring 56 is secured by ribs 58 to downstream end 42 of expansion section 38 of nozzle 10. Referring to FIG. 11, the ribs 58 may be attached to downstream end 42 of expansion section 38 of nozzle 10 by, for example, explosive bolts, electromechanical, hydraulic, or other actuated linkages that allow separation of annular ring 56 of fluid entrainment device 54 from nozzle 10 such that annular ring 56 can be jettisoned at a preferred time during the flight of vehicle 200. Note that the discardable nature to the fluid entrainment device is of not restricted to PDREs, and is applicable to single or multiple combustion chamber propulsion devices.

Figure 15:
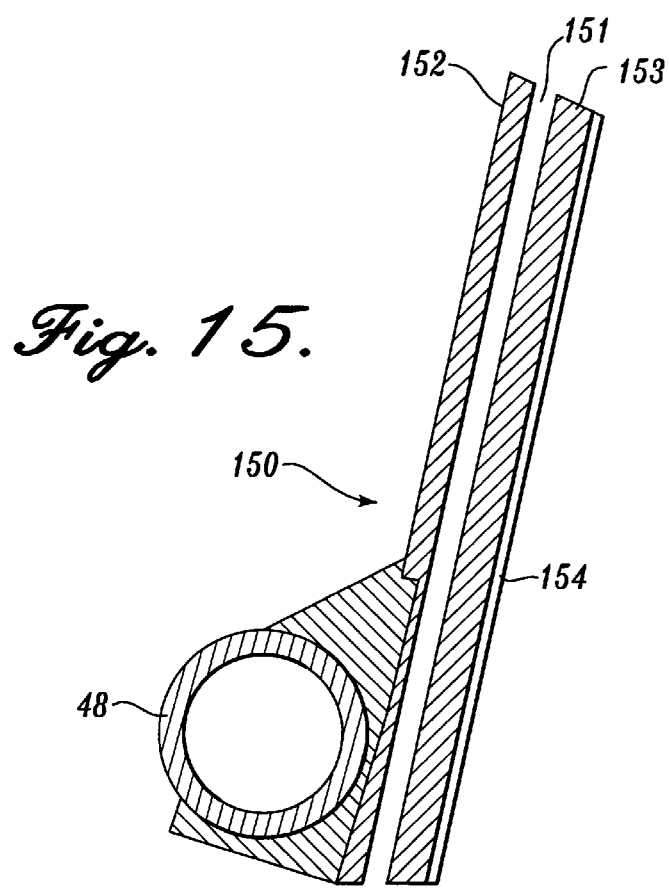
FIG. 15 is a section through a portion of a wall of the nozzle, showing a coolant ring manifold and inner linings and/or coatings.

FIG. 15 is an illustrative cross sectional view of an axial cut of a portion of a nozzle wall, in accordance with the invention. The nozzle wall 150 includes an outer structural liner 152, with an underlying inner structural liner 153. The inner structural liner 153 is coated or lined on its inside surface with a thermal barrier coating 154 and/or an ablative liner 154.

Figure 16:
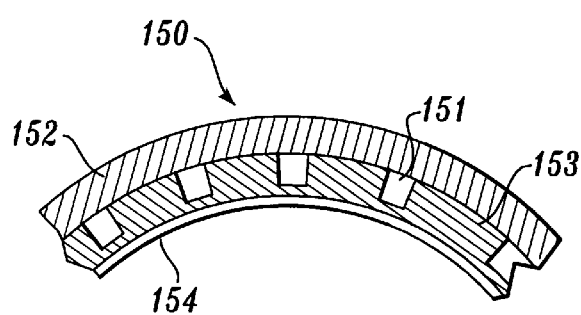
FIG. 16 is a cross sectional prop view of a portion of an embodiment of the wall of the nozzle illustrating channels for coolant fluid.

Referring to FIG. 16, the inner structural liner 153 includes means for cooling the nozzle such as the illustrated lengthwise extending fluid coolant channels 151, radially spaced around the nozzle. These coolant channels 151 provide passageways for the circulation of the coolant throughout the nozzle wall structure. The coolant may be collected to, or distributed from, a coolant ring manifold, such as manifold 48 shown in FIG. 15 that surrounds the perimeter of the nozzle.

Figure 17:
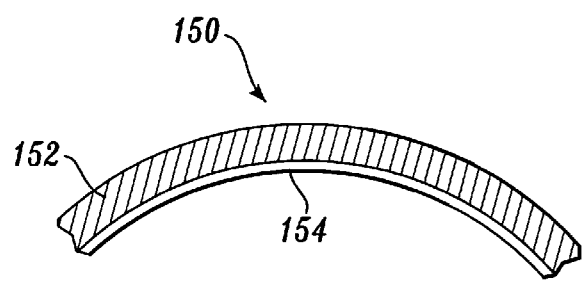
FIG. 17 is a section of a top view in cross section of an embodiment of a portion of a nozzle wall showing interior coatings and/or linings.

FIG. 17 is a top view of a cross section of a portion of the nozzle wall 150 without fluid coolant channels, but including a thermal barrier coating and/or ablative liner 154.

While the preferred embodiments of the invention have been illustrated and described, it will be appreciated that various changes can be made therein without departing from the spirit and scope of the invention.

REFERENCES

Sutton, G. P., "Rocket Propulsion Elements: An Introduction to the Engineering of Rockets," Wiley-Interscience Publications, New York, N.Y., 1992.

Mattingly, J. D., Heiser, W. H., and Daley, D. H., "Aircraft Engine Design," AIAA Education Series, AIAA, Washington, DC, 1987.

Oates, G. C., Editor, "Aircraft Propulsion Systems Technology and Design," AIAA Education Series, AIAA, Washington, DC, 1989.

Johnson, W., "Analytical and Experimental Study of the Pulsejet Ejector," Ph.D. Dissertation, Department of Mechanical Engineering, University of Clemson, 1967.

Heiser, W. H. "Thrust Augmentation." Paper No. 66-GT-116, American Society of Mechanical Engineers. 1966.

Lockwood, R. M. "Interim Summary Report on Investigation of the Process of Energy Transfer from an Intermittent Jet to a Secondary Fluid in an Ejector-type Thrust Augmentor." Hiller Aircraft Corp. Report No. ARD-286, Mar. 31, 1961.

Lockwood, R. M. "Interim Summary Report on Investigation of the Process of Energy Transfer from an Intermittent Jet to a Secondary Fluid in an Ejector-type Thrust Augmentor." Hiller Aircraft Corp. Report No. ARD-305, Jun. 30, 1962.

Clark, L. T., "Application of Compound Flow Analysis to Supersonic Ejector-Mixer Performance Prediction," AIAA Paper 95-0645, 1995.

Bernstein, A., Heiser, W., and Hevenor, C., "Compound-Compressible Nozzle Flow," AIAA Paper 66-663, 1966.

U.S. Pat. No. 5,345,758 of T. R. Bussing

The embodiments of the invention in which an exclusive property or privilege is claimed are defined as follows:

1. A nozzle for a detonative combustion engine having multiple sequentially-fired detonative combustor tubes, each tube having an exit end through which engine exhaust gas intermittently flows outward, said nozzle comprising:

a common plenum for communicating with the exit ends of the detonative combustor tubes and having a cross sectional area for engine exhaust gas flow bounded by only a single perimeter, the common plenum having a cross sectional area at least equal to the sum of cross sectional areas for exhaust gas flow of all the combustor tubes, said common plenum having an inlet end adjacent outlet ends of the combustor tubes for receiving and combining separate incoming exhaust gas streams which flow intermittently from the exit ends of each of the multiple combustor tubes the common plenum sized to produce a compound subsonic exhaust gas stream from the incoming exhaust gas streams; and a compound flow throat coupled to an exit end of the common plenum, the exit end of the a compound flow throat coupled to an exit end of the common plenum, the exit end of the plenum opposite the inlet end of the plenum, the compound flow throat in fluid communication with said common plenum and having a cross sectional area for flow of gases that is less than the cross sectional area for flow of gases at the common plenum exit end;

wherein said compound flow throat is sized to choke the gas flow therethrough by converting the compound subsonic exhaust gas stream from the common plenum into a compound sonic exhaust gas stream prior to the flow exiting the compound flow throat, the choked flow allowing the pressure at the combustor tube exit ends to be maintained at a predetermined level regardless of the pressure downstream of the throat.

2. The nozzle of claim 1, further comprising an interface section communicating with the common plenum, an inlet end of the interface section adapted for communicating with an exit end of each of the combustor tubes to receive exhaust gasses from the tubes, said interface section having a cross sectional area for exhaust gas flow that increases from the inlet end of the interface section to an outlet end of the interface section.

3. The nozzle of claim 1, further comprising an expansion section with an inlet end, the inlet end of the expansion section coupled to an outlet end of the compound flow throat, the expansion section sized with a smallest cross sectional area for gas flow at the inlet end thereof, and a largest cross sectional area for gas flow at an outlet end of the expansion section to allow expansion of exhaust gas volume sufficient to produce compound supersonic gas flow.

4. The nozzle of claim 3, further comprising a fluid entrainment device attached to a rear end of said expansion section.

5. The nozzle of claim 1, further comprising a thermal barrier coating on inner surfaces of the nozzle.

6. The nozzle of claim 1, further comprising an ablative liner on inner surfaces of the nozzle.

7. The nozzle of claim 1, further comprising means for cooling structural walls of the nozzle.

8. The nozzle of claim 7, wherein the means for cooling comprises elongate channels radially spaced apart and disposed in walls surrounding the nozzle.

9. The nozzle of claim 1, further comprising at least one coolant ring manifold surrounding the nozzle.

10. A nozzle for a detonative combustion engine having multiple detonative combustor tubes fired in a sequence, each tube having an exit end through which engine exhaust gas flows intermittently outward, said nozzle comprising:

an interface section having intake nozzles at an inlet end thereof, the nozzles each adapted to couple with an exit end of one of the multiple detonative combustor tubes to provide fluid communication of exhaust gases from the combustor tubes into the interface section, the interface section having an area for exhaust gas flow that increases from inlet ends of the intake nozzles to a rear end of the interface section;

a common plenum coupled to the rear end of the interface section, the plenum having an area for gas flow at least as large as the sum of areas for gas flow of the multiple detonative combustor tubes, said common plenum sized to combine intermittent flows of exhaust gases from the combustor tubes into a compound subsonic exhaust gas stream;

a compound flow throat coupled to a rear end of the plenum, the throat in fluid communication with the common plenum and having an area for gas flow that is less than the area for gas flow of the common plenum, said compound flow throat is sized to choke the gas flow therethrough by converting the compound subsonic exhaust gas stream from the plenum into a compound sonic exhaust stream; and an expansion section coupled to a rear end of and in fluid communication with the compound flow throat, the expansion section having an area for exhaust gas flow greater than the area for exhaust gas flow of the common plenum, said expansion section sized to convert the compound sonic exhaust gas stream from the throat into a compound supersonic exhaust stream;

wherein, when the nozzle is mounted to an operating engine, exhaust gas flows from the detonative combustor tubes through the interface section, through said common plenum, and thence through said compound flow throat and said expansion section, the choked flow allowing the nozzle to maintain a substantially invariant cyclical combustor tube exit pressure regardless of the pressure in an environment surrounding the nozzle.

11. The nozzle of claim 10, further comprising an air entrainment device attached to a rear end of said expansion section and in fluid communication with the expansion section.

12. The nozzle of claim 10, further comprising an ablative liner on inner surfaces of the nozzle.

13. The nozzle of claim 10, further comprising a thermal barrier coating on inner surfaces of the nozzle.

14. The nozzle of claim 10, further comprising means for cooling walls of the nozzle.

15. A method of controlling the exit pressure of detonative combustor tubes of a sequentially-fired multiple tube detonative combustion engine, the method comprising:

(a) sequentially expanding intermittent flows of exhaust gas from exit ends of each of the multiple detonative combustor tubes of the combustion engine through separate flow passages of an inlet end of an exhaust nozzle, the separate flow passages each increasing in cross sectional area for flow from an inlet end to an outlet end of the passage;

(b) combining the expanded exhaust gas to produce compound subsonic flow conditions in a common plenum of an exhaust nozzle;

(c) constricting the combined, expanded exhaust gases in a throat of an exhaust nozzle to choke the flow to produce compound sonic flow velocity;

(d) exiting the exhaust gases from an outlet end of a nozzle at compound supersonic conditions into a surrounding environment;

wherein, when the nozzle is mounted to an operating engine, cyclical pressures generated by exhaust gasses at exit ends of each of the detonative combustor tubes, by sequential firing of the tubes, are maintained substantially invariant from one firing cycle to another, regardless of ambient pressure in the surrounding environment.

16. The method of claim 15, further comprising cooling walls of the nozzle through which exhaust gases flow, by means of a coolant fluid.

17. The method of claim 15, further comprising flowing the exiting exhaust gases at supersonic conditions through an air entrainment device.

18. A method of controlling the exit pressure of detonative combustor tubes of a multiple tube sequentially-fired detonative combustion engine, the method comprising:

(a) combining sequentially expanded intermittent exhaust gas flows from exit ends of each of the multiple sequentially-fired detonative combustor tubes of the combustion engine in a common plenum of an exhaust nozzle to produce compound subsonic exhaust gas flow conditions;

(b) constricting the combined exhaust gases in a compound throat of the exhaust nozzle to choke the flow to produce a compound sonic exhaust gas flow; and (c) maintaining a substantially constant cyclical pressure at an exit end of each of the multiple combustor tubes regardless of ambient pressure in a surrounding environment, by means of steps (a) and (b).

19. The method of claim 18, wherein the step of combining sequentially expanded exhaust gas flows comprises expanding exhaust gas through separate flow passages of an inlet end of the exhaust nozzle, the separate flow passages each increasing in cross sectional area for flow from an inlet end to an outlet end of each passage.

20. The method of claim 18, further comprising after step (b) exiting the exhaust gases from a divergent outlet end of the nozzle at compound supersonic conditions into a surrounding environment.

* * * * *

UNITED STATES PATENT AND TRADEMARK OFFICE
CERTIFICATE OF CORRECTION

Page 1 of 2

PATENT NO. : 6,003,301
DATED : December 21, 1999
INVENTOR(S) : T.E. Gratkovich, et. al.

It is certified that error appears in the above-identified patent and that said Letters Patent is hereby corrected as shown below:

Title page,

| | | |
|---|---|---|
| item [56] Pg. 1, col. 2 | Refs. Cited (U.S. Pats.) | After "5,212,944  5/1993  Martin et al." insert --5,353,588  10/11/1994  T.R. Bussing-- |
| [56] | Refs. Cited (U.S. Pats.) | Insert following references in appropriate patent order: |

--1,552,272    09/01/1925    Carner
1,731,778    10/15/1929    Holzwarth
2,557,198    06/19/1951    Nichols
2,888,803    06/02/1959    Pon
2,930,196    03/29/1960    Hertzberg et al.
4,510,748    04/16/1985    Adams
4,570,438    02/18/1986    Lorenz
4,693,075    09/15/1987    Sabatiuk
4,807,440    02/28/1989    Salem
4,947,641    08/14/1990    Rodgers
5,513,489    05/07/1996    Bussing, T.R.
2,684,571    11/27/1950    Wright
3,119,436    01/28/1964    Rydberg
3,606,867    03/05/1970    Briffa
4,787,579    11/29/1988    Smith--

UNITED STATES PATENT AND TRADEMARK OFFICE
CERTIFICATE OF CORRECTION

Page 2 of 2

PATENT NO. : 6,003,301
DATED : December 21, 1999
INVENTOR(S) : T.E. Gratkovich, et. al.

It is certified that error appears in the above-identified patent and that said Letters Patent is hereby corrected as shown below:

[56] References Pg. 1, col. 12 (Other Info.)

Insert following reference:

--FOA, J.V., "Intermittant Jets," Vol. XII High Speed Aerodynamics and Jet Propulsion, 1959.

O'Brien, J.G. "The Pulse Jet Engine A Review of Its Development Potential," Naval Postgraduate School, June 1974.--

Signed and Sealed this

Sixth Day of February, 2001

Attest:

Q. TODD DICKINSON

*Attesting Officer*      *Director of Patents and Trademarks*

UNITED STATES PATENT AND TRADEMARK OFFICE
CERTIFICATE OF CORRECTION

PATENT NO. : 6,003,301
DATED : December 21, 1999
INVENTOR(S) : T.E. Bratkovich et al.

It is certified that error appears in the above-identified patent and that said Letters Patent is hereby corrected as shown below:

Title page,
Item [56] References Cited (U.S. Pats.), after "5,212,944  5/1993 Martin et al." insert
--5,353,588  10/11/1994 T.R. Bussing --

Refs. Cited (U.S. Pats.), insert the following references in appropriate patent order:
| | | |
|---|---|---|
| -- 1,552,272 | 09/01/1925 | Carner |
| 1,731,778 | 10/15/1929 | Holzwarth |
| 2,557,198 | 06/19/1951 | Nichols |
| 2,888,803 | 06/02/1959 | Pon |
| 2,930,196 | 03/29/1960 | Hertzberg et al. |
| 4,510,748 | 04/16/1985 | Adams |
| 4,570,438 | 02/18/1986 | Lorenz |
| 4,693,075 | 09/15/1987 | Sabatiuk |
| 4,807,440 | 02/28/1989 | Salem |
| 4,947,641 | 08/14/1990 | Rodgers |
| 5,513,489 | 05/07/1996 | Bussing, T.R. |
| 2,684,571 | 11/27/1950 | Wright |
| 3,119,436 | 01/28/1964 | Rydberg |
| 3,606,867 | 03/05/1970 | Briffa |
| 4,787,579 | 11/29/1988 | Smith -- |

Item [56],
References (Other Info.) Insert following reference:
-- FOA, J.V., "Intermittant Jets," Vol. XII High Speed Aerodynamics and Jet Propulsion, 1959.

UNITED STATES PATENT AND TRADEMARK OFFICE
CERTIFICATE OF CORRECTION

PATENT NO.    : 6,003,301
DATED         : December 21, 1999
INVENTOR(S)   : T.E. Bratkovich et al.

It is certified that error appears in the above-identified patent and that said Letters Patent is hereby corrected as shown below:

Title page,
Item [56], O'Brien, J.G. "The Pulse Jet Engine A Review of Its Development Potential," Naval Postgraduate School, June 1974. --

Signed and Sealed this

Twenty-third Day of October, 2001

*Attest:*

*Attesting Officer*

NICHOLAS P. GODICI
*Acting Director of the United States Patent and Trademark Office*